(12) United States Patent
Mork et al.

(10) Patent No.: US 9,770,743 B2
(45) Date of Patent: Sep. 26, 2017

(54) COLLOIDAL AGENTS FOR AQUIFER REMEDIATION

(71) Applicant: REGENESIS BIOREMEDIATION PRODUCTS, San Clemente, CA (US)

(72) Inventors: Benjamin V. Mork, Newport Beach, CA (US); Joy M. Gravitt, Costa Mesa, CA (US); Ryan A. Ferguson, Newport Beach, CA (US); Stephanie R. Rittenhouse, San Clemente, CA (US); Kristen A. Thoreson, Irvine, CA (US)

(73) Assignee: REGENESIS BIOREMEDIATION PRODUCTS, San Clemente, CA (US)

( * ) Notice: Subject to any disclaimer, the term of this patent is extended or adjusted under 35 U.S.C. 154(b) by 199 days.

(21) Appl. No.: 14/449,404

(22) Filed: Aug. 1, 2014

(65) Prior Publication Data

US 2015/0034559 A1 Feb. 5, 2015

Related U.S. Application Data

(60) Provisional application No. 61/861,854, filed on Aug. 2, 2013.

(51) Int. Cl.
  *B09C 1/08* (2006.01)
  *B01J 20/26* (2006.01)
  *B09C 1/00* (2006.01)

(52) U.S. Cl.
  CPC .............. *B09C 1/08* (2013.01); *B01J 20/26* (2013.01); *B09C 1/002* (2013.01); *B09C 2101/00* (2013.01)

(58) Field of Classification Search
  None
  See application file for complete search history.

(56) References Cited

U.S. PATENT DOCUMENTS

| | | | | |
|---|---|---|---|---|
| 4,664,809 A | * | 5/1987 | Fenton | B09C 1/002 210/660 |
| 5,580,770 A | * | 12/1996 | DeFilippi | C02F 3/06 210/615 |
| 6,200,530 B1 | * | 3/2001 | Markels, Jr. | A01G 15/00 119/200 |
| 6,398,960 B1 | * | 6/2002 | Borden | B09C 1/00 166/296 |
| 7,337,711 B2 | * | 3/2008 | Holcomb | A47J 19/022 99/506 |
| 7,845,883 B1 | * | 12/2010 | Siler, III | B09C 1/002 166/270.1 |
| 8,337,711 B2 | * | 12/2012 | Dorian | B01L 3/5021 210/360.1 |
| 2003/0047507 A1 | | 3/2003 | Hou et al. | |
| 2005/0282390 A1 | * | 12/2005 | Bian | C09G 1/02 438/692 |
| 2006/0154815 A1 | * | 7/2006 | Abe | C01B 31/14 502/416 |
| 2006/0196850 A1 | * | 9/2006 | Roh | B24B 37/044 216/88 |
| 2010/0234233 A1 | * | 9/2010 | Sannino | A61L 15/225 504/360 |
| 2011/0260098 A1 | * | 10/2011 | Ma | C02F 1/683 252/181 |
| 2013/0058724 A1 | * | 3/2013 | John | B09C 1/002 405/128.5 |

FOREIGN PATENT DOCUMENTS

JP  2006-75799  * 3/2006

OTHER PUBLICATIONS (Dowfax 2A1 surfactant) Pub date: Aug. 25, 2008 Author: Bigsunchem.*
(Carbon-Iron_ An Fe/AC composite_as alternative to nano-iron for groundwater treatment) Pub date: Apr. 26, 2012 Author: Mackenzie.*
Mackenzie et al., "Carbo-Iron an Fe/AC composite as alternative to nano-iron for groundwater treatment", Water Res.; Aug. 2012, vol. 46 (12); pp. 3817-3826; (retrieved from Internet: (http:www///.sciencedirect.com/science/article/pii/S0043135412002552#), pp. 38'9, col. 2. para 2; p. 3820, col. 1, para 4; p. 3822, col. 2, para 2-3; abstract.

* cited by examiner

*Primary Examiner* — Chester Barry
(74) *Attorney, Agent, or Firm* — Steina Brunda Garred & Brucker

(57) ABSTRACT

Compositions and methods for treating contaminated soil and/or ground water in situ. The compositions and methods comprise stabilized forms of colloidal activated carbon that are used to quickly sorb contaminants. Unlike traditional activated carbon in granular or powder form, the compounds and methods of the present invention are operative to transport particulate activated carbon through a matrix of soil and groundwater upon application by injection, gravity feed, or percolation into soil and groundwater, which in turn decontaminate groundwater in place without the cost or disruption associated with digging the contaminated soil and groundwater out of the ground for on-site purification or disposal at a hazardous waste landfill.

16 Claims, No Drawings

COLLOIDAL AGENTS FOR AQUIFER REMEDIATION

CROSS-REFERENCE TO RELATED APPLICATIONS

The present application claims priority to U.S. Provisional Patent Application Ser. No. 61/861,854, filed Aug. 2, 2013, entitled COLLOIDAL AGENTS FOR AQUIFER REMEDIATION, all of the teachings of which are incorporated herein by reference.

STATEMENT RE: FEDERALLY SPONSORED RESEARCH/DEVELOPMENT

Not Applicable

BACKGROUND

The present invention is directed to stabilized compositions of particulate activated carbon and the use of such compositions to adsorb contaminants from soil and groundwater.

Activated carbon is commonly used as a sorbent medium for removing organic and inorganic contaminants from water. It is used in treatment systems to detoxify industrial process water, as well as in pump-and-treat systems for above-ground treatment of contaminated groundwater. In use activated carbon is typically manufactured and used in granular or powder form whereby the particulate is loaded into fluid- or fixed-bed treatment systems or dispersed or distributed over the area subject to contamination.

The in situ (in place) application of activated carbon to soil and groundwater allows for the capture or immobilization of contaminants from groundwater via sorption onto the carbon. This inhibits the migration of a contaminant plume and lowers the risk of damage to human health or ecological systems. Exemplary prior art teachings of carbon-based compositions for use in environmental remediation include the following references:

U.S. Pat. No. 4,664,809, issued May 12, 1987, to Fenton, entitled GROUNDWATER POLLUTION ABATEMENT, discloses drilling of wells in the ground and injecting a sorbent for contaminants into the path of groundwater plume, in order to stop the plume. Such reference further discloses the use of activated carbon as a sorbent and the addition of stabilizing substances to sorbent slurries.

In the name of Kopinke, F.-D.; Woszidlo, S.; Georgi, A., European Patent Application EP 1462187 A2, filed Mar. 2, 2004, "Verfahren zur in-situ Dekontamination schadstoffbelasteter Aquifere," discloses a process for in-situ decontamination of polluted aquifers—by injection of colloidal carbon. Such reference discloses that a charcoal particle size <10 microns is optimal and that ionic strength inhibits colloid transport. The objective of the invention is to increase distribution of carbon colloids in subsurface by flushing with deionized water or raising pH of aquifer.

Georgi, A.; Schierz, A.; Mackenzie, K.; Kopinke, F.-D., Terra Tech, 2007, 16, (11-12), 2-4. "Mobile Kolloide. Anwendung von kolloidaler, Aktivkohle zur In-Situ-Grundwasserreinigun, (in German) also refers to aquifer treatment with colloidal activated carbon and that a 0.1 to 10 micron activated carbon particle size is needed for stability and mobility. The optimal particle size is disclosed as 0.5 to 2 microns. Moreover, such reference teaches that humic acid and carboxymethylcellulose are stabilizers of activated carbon colloids and can have a max loading of <10% on carbon.

Mackenzie, K., et al.; *Water Research* 2012, entitled "Carbo-iron—An Fe/AC composite—As alternative to nano-iron groundwater treatment" and supporting information is a paper teaching the use of "carbo-iron" an activated carbon material that has embedded iron metal particles for contaminant treatment. The carbo-iron is comprised mostly of activated carbon and behaves similarly to activated carbon as a colloidal material. Such reference discloses that max loading of CMC onto carbo-iron is 7% w/w and that no further stabilization benefit occurs above 5% w/w loading of CMC.

The teachings of all the aforementioned references are incorporated herein by reference. Notwithstanding their respective teachings, however, there are significant limitations regarding the use and efficacy of in situ activated carbon treatments. In particular, as a solid powder or granular material, activated carbon cannot distribute through soil to reach areas of contaminated water. Instead, it must be applied in a trench to treat water passing therethrough, or must be injected as a slurry which has limited or no mobility in the aquifer. This lack of mobility causes the cost of treatment to be very high, whereas the contact with contaminated water remains quite low. The high cost is primarily due to the large number of application points required to thoroughly treat a contaminated area.

To facilitate treatment of contaminated groundwater, it is desirable to have a form of activated carbon that can transport effectively through an aquifer to reach contaminated zones while remaining highly sorbent toward contaminants.

The prior art Georgi (2007) and Mackenzie (2012) references referred to above disclose that sodium carboxymethyl cellulose (a polyanionic polymer) stabilizes colloidal activated carbon against settling. It also has some effect to increase transport of activated carbon through soil and groundwater in situ. As the carbon contacts the contaminated groundwater, contaminants are sorbed out of solution and onto the carbon particles. Carboxymethyl cellulose-stabilized colloidal carbon can also transport somewhat in the aquifer, but is destabilized and deposited by ionic strength of the water (Kopinke 2004).

It is therefore desirable to have improved methods and compositions that will distribute colloidal activated carbon much further in the subsurface than simple carboxymethyl cellulose. It is likewise desirable to provide such a composition of colloidal activated carbon that is of simple formulation, easy to deploy, is substantially effective at adsorbing contaminants from soil and groundwater, and is further substantially more effective in becoming dispersed and capable of being quickly and effectively deployed over a greater area of volume of soil and groundwater than prior art activated carbon compositions and methods of using the same for environmental remediation.

BRIEF SUMMARY

The present invention specifically addresses and alleviates the above-identified deficiencies in the art. In this regard, the present invention is directed to compositions of stabilized activated carbon and the use of such compositions in environmental remediation, and in particular as a means of absorbing contaminants in soil and groundwater. According to a preferred embodiment, the invention comprises the combination of activated carbon, preferably formed to have a very fine particulate size, typically ranges from 0.1 to 10 microns, and preferably 0.5 to 2 microns, that are stabilized by at least two additives. The first additive is a stabilizing polymer, which may comprise either an anionic or nonionic polymer. The second additive is a distribution enhancement agent operative to facilitate the ability of the composition to become distributed and dispersed about a matrix of soil and groundwater. Preferably, the distribution enhancement agent will include one or more agents selected from the group consisting of chelating agents, anionic polymers, anionic surfactants or nonionic surfactants.

According to a preferred embodiment, the ratio of activated carbon:first additive:second additive present in amounts relative one another are in the range of 1 (carbon): 0.01-1.0 (first additive):0.01-1.0 (second additive). In a more highly refined embodiment, the ratio of the aforementioned components of activated carbon:first additive:second additive are in the range of 1 (carbon):0.05-0.5 (first additive):0.025-0.5 (second additive), based upon relative weights of such components.

In use, the compositions of the present invention are operative to form water-based colloids of activated carbon, and can be deployed as an aqueous admixture whereby the activated carbon component of the aqueous admixture will range between 0.01% and 70.0% by weight of the water. In a more highly-refined method, the water based colloids of the present invention can be injected, such as by high pressure injection or fracturing, in the range of 0.05% to 40.0% activated carbon by weight in water and in a yet further, more highly refined embodiment, can be injected in the range of 0.1% to 20.0% carbon by weight in water. In addition to injection, the water-based colloids formed according to the present invention can be applied by gravity feed or percolation into soil. As for general application rates, the compositions of the present invention can be applied at a rate between approximately 1 and 80 gallons of aqueous admixture per cubic yard of soil and groundwater, and preferably between approximately 4 and 60 gallons per cubic yard.

DETAILED DESCRIPTION

The detailed description set forth below is intended as a description of the presently preferred embodiment of the invention, and is not intended to represent the only form in which the present invention may be implemented or performed. The description sets forth the functions and sequences of steps for practicing the invention. It is to be understood, however, that the same or equivalent functions and sequences may be accomplished by different embodiments and that they are also intended to be encompassed within the scope of the invention.

New compositions and methods have been developed that enable increased distribution of activated carbon colloids through soil and groundwater. This allows for very cost-effective treatment of contaminated aquifers, and therefore control over mobility of contaminants in groundwater and soil systems.

The present invention is a mixture of very fine activated carbon (0.1 to 10 micron size, and preferably within a 0.5 to 2 micron range) stabilized by at least two additives, wherein the first additive is a stabilizing polymer, and the second additive is a distribution enhancement agent. The addition of one or more distribution enhancement agents enables the colloidal material to distribute significantly further through soil and groundwater during application than the compositions and methods of the prior art.

The first additive, or stabilizing polymer, can be an anionic polymer or a nonionic polymer. Examples include but are not limited to carboxymethyl cellulose (CMC), carrageenan, polyacrylic acid, xanthan gum (nonionic), and combinations thereof.

The second additive, or distribution enhancement agent, is selected from the following list: chelating agents, anionic polymers, anionic surfactants, or nonionic surfactants, and possible combinations thereof.

Chelating agents include but are not limited to citrates, phosphates (e.g. SHMP, STTP, TSPP), silicates, borates, sulfates, carbonates, aminocarboxylic acids and salts thereof (e.g. EDTA, MGDA and NTA), polyamines such as ethylene diamine, as well as combinations thereof.

Anionic polymers of the second additive include but are not limited to sulfated or carboxylated polysaccharides, polyacrylates, polyacrylamides, lignosulfonate, polyacrylate copolymers, and combinations thereof.

Anionic surfactants include but are not limited to dioctyl sodium sulfosuccinate, alkyl and aryl sulfates (e.g. sodium lauryl sulfate), alkyl carboxylates (e.g. sodium laurate) and combinations thereof.

Nonionic surfactants include but are not limited to alkyl polyethylene oxides, ethylene oxide polymers, polyethylene oxide lauryl ether (e.g., Brij 30® produced by Croda, Inc.), ethylene oxide-propylene oxide copolymers (e.g., Tergitol XD® produced by the Dow Chemical Company), and combinations thereof.

Compositions of this invention are preferably formed wherein the relative weight ratios of carbon:first additive (stabilizing polymer):second additive (distribution enhancing agent) are in the range of: 1:0.01-1.0:0.01-1.0 and preferably in the ranges of 1:0.05-0.5:0.025-0.5

The method of groundwater treatment using this invention includes injection or other application of the above compositions as a water-based colloid such that the activated carbon concentration between 0.01% and 70.0% by weight in water. Preferably, the material can be injected in the range of 0.05% to 40.0% activated carbon by weight in water. Even more preferably, it can be injected in the range of 0.1% to 20.0% carbon by weight in water. In addition to injection, such as high pressure injection and fracturing, the aqueous admixture containing the compositions of the present invention can be applied by gravity feed or percolation in the amount sufficient to adsorb the contaminants believed to be present in a given area of contaminated soil/groundwater. Along those lines, depending on the site geology and degree of contamination, a general application rate can range from between approximately 1 to 80 gallons of the aqueous admixture of the water-based colloid of the present invention per cubic yard of soil and groundwater to be treated, and preferably between approximately 4 and 60 gallons of the aqueous admixture per cubic yard treated.

By way of illustration, and by no means as limiting the present invention, the following examples are provided:
Example 1: Dispersion preparation: A series of colloidal dispersions were prepared with the following general composition: 1% w/w activated carbon (approximately 1.5 micron average particle size), 0.25% w/w stabilizing polymer, and 0.25% w/w distribution enhancement agent. The dispersions were prepared as follows: The stabilizing polymer and second additive were mixed thoroughly into water with a high-shear mixer and mixed until homogeneous. A slurry of activated carbon in water was then added to the mixture. Each dispersion was mixed for an additional 5 minutes resulting in a very homogeneous, black colloidal suspension. The compositions of the tested dispersions and some comparative samples are shown in Table 1.

Example 2: Column transport testing: Each of the colloids in Example 1 was diluted with tap water to a carbon concentration of 2,000 mg/L. A 25 g aliquot of each diluted colloid was eluted through a glass column (bed dimensions 2.5×24.0 cm) packed with saturated soil having a sand/silt/clay ratio of 93.7/3.9/2.4. The 25 g sample was eluted through the column and flushed with additional tap water until the column effluent was clear. Activated carbon in the combined effluent from each column study was measured by UV-visible spectroscopy. The total mass of carbon eluted was calculated using a calibration curve. For comparison to the prior art, a standard colloid sample stabilized only by CMC was studied (Sample #1). The mass of carbon eluted by each sample is reported in table 1, and the amount of carbon eluted is also reported as a percentage relative to the standard.

The data in Table 1 show that the present invention results in significant increases of activated carbon colloid transport through soil and groundwater. It is also apparent from these data that the use of the stabilizing polymer or distribution enhancement agents alone results in very poor performance, and therefore their combination is required. This invention provides a significant improvement in efficiency and reduction in cost for treatment of contaminated aquifers.

TABLE 1

Composition and Column Study Data

| Sample Number | Stabilizing Polymer | Distribution Enhancer | mg Carbon Eluted | Carbon Eluted vs Standard |
|---|---|---|---|---|
| 1 | CMC (standard) | None | 5.4 | 100% |
| 2 | CMC | MGDA | 17.3 | 320% |
| 3 | CMC | ethylene oxide/propylene oxide copolymer (Tergitol XD ®) | 21.1 | 391% |
| 4 | CMC | EDTA | 14.1 | 261% |
| 5 | CMC | Sodium citrate | 18.2 | 337% |
| 6 | CMC | NTA | 20.5 | 380% |
| 7 | CMC | SHMP | 14.7 | 272% |
| 8 | CMC | STPP | 20.0 | 370% |
| 9 | CMC | Lignosulfonate | 21.1 | 391% |
| 10 | CMC | polyethylene oxide lauryl ether (Brij 30 ®) | 20.2 | 374% |
| 11 | CMC | SLS | 22.4 | 415% |
| 12 | CMC | Sodium laurate | 24.5 | 454% |
| 13 | CMC | DSS | 15.7 | 291% |
| 14 | CMC | TSPP | 16.0 | 296% |
| 15 | CMC | SDBS | 22.8 | 422% |
| 16 | Carrageenan | None | 5.1 | 94% |
| 17 | Carrageenan | SHMP | 11.5 | 213% |
| 18 | Xanthan Gum* | None | 7.5 | 139% |
| 19 | Xanthan Gum* | STPP | 16.1 | 298% |
| 20 | None | MGDA | 0 | 0% |
| 21 | None | polyethylene oxide lauryl ether (Brij 30 ®) | 0 | 0% |
| 22 | None | ethylene oxide/propylene oxide copolymer (Tergitl XD ®) | 0 | 0% |
| 23 | None | None | 0 | 0% |

Xanthan gum experiments were run on shorter columns and therefore not directly comparable Abbreviations as utilized and referenced in the specification:
CMC carboxymethyl cellulose, sodium salt
DSS dioctyl sodium sulfosuccinate
EDTA ethylenediaminetetraacetic acid, sodium salt
MGDA methylglycine diacetic acid, sodium salt
NTA nitrilotriacetic acid, sodium salt
SDBS sodium dodecylbenzenesulfonate
SHMP sodium hexametaphosphate
SLS sodium lauryl sulfate
STPP sodium tripolyphosphate
TSPP tetrasodium pyrophosphate Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. A composition for use in aquifer remediation, said composition consisting essentially of:

particulate activated carbon;

a stabilizing polymer;

a distribution enhancement agent chosen from an anionic surfactant, nonionic surfactant, chelating agent, or combinations thereof, any chelating agents chosen being from the group consisting of: citrates, phosphates, silicates, borates, sulfates, carbonates, aminocarboxylic acids and salts thereof, polyamines, and combinations thereof; and wherein said particulate activated carbon:stabilizing polymer:distribution enhancement agent are present in amounts relative one another by weight in a ratio in a range of 1:0.01-1.0:0.01-1.0.

2. The composition of claim 1 wherein said relative amounts of particulate carbon:stabilizing polymer:distribution enhancement agent are present in a ratio in a range of 1:0.05-0.5:0.025-0.5.

3. The composition of claim 1 wherein said stabilizing polymer is selected from the group consisting of an anionic polymer and a nonionic polymer.

4. The composition of claim 3 wherein said stabilizing polymer is selected from the group consisting of carboxymethyl cellulose, carrageenan, polyacrylate, xanthan gum, and combinations thereof.

5. The composition of claim 1 wherein said nonionic surfactants of said distribution enhancement agent is selected from the group consisting of alkyl polyethylene oxides, ethylene oxide polymers, polyethylene oxide lauryl ether, ethylene oxide-propylene oxide copolymers and combinations thereof.

6. The composition of claim 1 wherein said particulate activated carbon has a particle size ranging from 0.1 to 10 microns.

7. An aqueous admixture for removing contaminants from an aquifer consisting essentially of:

particulate activated carbon;

a stabilizing polymer;

a distribution enhancement agent chosen from an anionic surfactant, nonionic surfactant, chelating agent, or combinations thereof, any chelating agents chosen being from the group consisting of: citrates, phosphates, silicates, borates, sulfates, carbonates, aminocarboxylic acids and salts thereof, polyamines, and combinations thereof; and wherein said ratio of said particulate activated carbon:stabilizing polymer:distribution enhancement agent are present in amounts relative one another by weight in a range of 1:0.01-1.0:0.01-1.0;

water; and wherein said water, particulate activated carbon, stabilizing polymer and distribution enhancement agent are operative to form a colloid wherein said particulate carbon is present in an amount ranging from 0.01% to 70.0% by weight in said water.

8. The aqueous admixture of claim 7 wherein said particulate carbon is present in an amount ranging from 0.05% to 40.0% by weight in said water.

9. The aqueous admixture of claim 7 wherein said particulate carbon is present in an amount ranging from 0.1% to 20.0% by weight in water.

10. The aqueous admixture of claim 7 wherein said particulate activated carbon has a particle size ranging from 0.1 to 10 microns.

11. A method of capturing or immobilizing contaminants from soil and groundwater comprising the steps:
  a) forming an aqueous admixture, said aqueous admixture consisting essentially of:
    particulate activated carbon;
    a stabilizing polymer;
    a distribution enhancement agent chosen from an anionic surfactant, nonionic surfactant, chelating agent, or combinations thereof, any chelating agents chosen being from the group consisting of: citrates, phosphates, silicates, borates, sulfates, carbonates, aminocarboxylic acids and salts thereof, polyamines, and combinations thereof; and
    wherein said ratio of said particulate activated carbon:stabilizing polymer:distribution enhancement agent are present in amounts relative one another by weight in a range of 1:0.01-1.0:0.01-1.0; and
    water;
    wherein said particulate carbon is present in an amount ranging from 0.01% to 70% by weight in said water; and
  b) applying said aqueous admixture formed in step a) to said soil and groundwater such that said admixture becomes distributed and dispersed within said soil and groundwater.

12. The method of claim 11 wherein in step b), said aqueous admixture is applied by injection into said soil and groundwater.

13. The method of claim 12 wherein said injection comprises high pressure injection or fracturing.

14. The method of claim 11 wherein step b) said aqueous admixture is applied by gravity feed to said soil and groundwater.

15. The method of claim 11 wherein step b) said aqueous admixture is applied by percolation.

16. The method of claim 11 wherein in step a), said particulate activated carbon has a particle size ranging from 0.1 to 10 microns.

* * * * *